United States Patent
Yamada

(10) Patent No.: US 12,520,881 B2
(45) Date of Patent: Jan. 13, 2026

(54) INHALATION DEVICE, SYSTEM, AND NON-TRANSITORY COMPUTER READABLE MEDIUM

(71) Applicant: JAPAN TOBACCO INC., Tokyo (JP)

(72) Inventor: Manabu Yamada, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 479 days.

(21) Appl. No.: 17/988,152

(22) Filed: Nov. 16, 2022

(65) Prior Publication Data
US 2023/0088388 A1 Mar. 23, 2023

Related U.S. Application Data

(63) Continuation of application No. PCT/JP2020/035239, filed on Sep. 17, 2020.

(51) Int. Cl.
| | |
|---|---|
| A24F 40/65 | (2020.01) |
| A24F 40/53 | (2020.01) |
| A61M 11/04 | (2006.01) |
| H04W 4/80 | (2018.01) |
| H04W 76/11 | (2018.01) |
| H04W 76/19 | (2018.01) |

(52) U.S. Cl.
CPC ............ *A24F 40/65* (2020.01); *A24F 40/53* (2020.01); *A61M 11/042* (2014.02); *H04W 4/80* (2018.02); *H04W 76/11* (2018.02); *H04W 76/19* (2018.02); *A61M 2205/3569* (2013.01); *A61M 2205/3584* (2013.01); *A61M 2205/52* (2013.01)

(58) Field of Classification Search
CPC ....... A24F 40/65; A24F 40/53; A61M 11/042; H04W 76/19; H04W 4/80; H04W 76/11
See application file for complete search history.

(56) References Cited

U.S. PATENT DOCUMENTS

| | | | |
|---|---|---|---|
| 2017/0142334 A1* | 5/2017 | Yamashita | G06F 1/3278 |
| 2018/0270311 A1* | 9/2018 | Baker | A24F 40/65 |
| 2018/0293831 A1* | 10/2018 | Takeuchi | G06Q 20/322 |
| 2019/0045837 A1* | 2/2019 | Spencer | H05B 1/0297 |
| 2019/0230408 A1 | 7/2019 | Borghei et al. | |
| 2020/0093185 A1* | 3/2020 | Lim | A24F 40/53 |
| 2020/0260793 A1 | 8/2020 | Yamada et al. | |

(Continued)

FOREIGN PATENT DOCUMENTS

| | | |
|---|---|---|
| CN | 108697171 A | 10/2018 |
| CN | 110446435 A | 11/2019 |

(Continued)

OTHER PUBLICATIONS

Japanese Office Action for Japanese Application No. 2022-550258, dated Jan. 21, 2025, with English translation.

(Continued)

*Primary Examiner* — David Bilodeau
(74) *Attorney, Agent, or Firm* — Birch, Stewart, Kolasch & Birch, LLP

(57) ABSTRACT

An inhalation device uses a base substance to generate aerosol to be inhaled by a user. The inhalation device includes a storage unit that stores information, a communication unit that receives information from another device when a first condition is satisfied, and a control unit that causes the storage unit to store the information received from the other device when a second condition is satisfied.

19 Claims, 7 Drawing Sheets

(56) References Cited

U.S. PATENT DOCUMENTS

| | | | |
|---|---|---|---|
| 2020/0329356 A1* | 10/2020 | Moloney | H04W 8/005 |
| 2022/0071295 A1* | 3/2022 | Strophair | A24F 40/53 |
| 2024/0188642 A1 | 6/2024 | Lim et al. | |
| 2024/0245137 A1 | 7/2024 | Yamada et al. | |

FOREIGN PATENT DOCUMENTS

| | | |
|---|---|---|
| CN | 110691523 A | 1/2020 |
| CN | 111432671 A | 7/2020 |
| CN | 111511235 A | 8/2020 |
| JP | 2012-234227 A | 11/2012 |
| JP | 2018-536309 A | 12/2018 |
| JP | 2019-509720 A | 4/2019 |
| JP | 6691138 B2 | 4/2020 |
| JP | 2020-80654 A | 6/2020 |
| JP | 2020-526208 A | 8/2020 |
| JP | 2021-509551 A | 3/2021 |
| KR | 10-2020-0093610 A | 8/2020 |
| WO | WO 2017/141017 A1 | 8/2017 |
| WO | WO 2018/138749 A1 | 8/2018 |
| WO | WO 2019/082264 A1 | 5/2019 |
| WO | WO 2019/129751 A1 | 7/2019 |

OTHER PUBLICATIONS

International Search Report, issued in PCT/JP2020/035239, dated Nov. 10, 2020.
Chinese Office Action and Search Report for Chinese Application No. 202080100393.7, dated Apr. 24, 2025, with English translation.
English translation of Chinese Office Action for Chinese Application No. 202080100393.7, dated Nov. 8, 2025.
Korean Office Action for Korean Application No. 10-2022-7033769, dated Nov. 27, 2025, with English translation.

\* cited by examiner

INHALATION DEVICE, SYSTEM, AND NON-TRANSITORY COMPUTER READABLE MEDIUM

This application is a continuation application based on International Patent Application No. PCT/JP2020/035239 filed on Sep. 17, 2020, and the content of the PCT international application is incorporated herein by reference.

TECHNICAL FIELD

The present invention relates to an inhaler device, a system, and a non-transitory computer readable medium.

BACKGROUND ART

Inhaler devices, such as electronic cigarettes and nebulizers, that generate material to be inhaled by users have come into widespread use. For example, an inhaler device uses an aerosol source and a substrate including a flavor source to generate an aerosol to which a flavor component is imparted. The aerosol source is used to generate the aerosol, and the flavor source is used to impart the flavor component to the generated aerosol. The user can enjoy the flavor by inhaling the aerosol that is generated by the inhaler device and to which the flavor component is imparted.

Recently, provision of various services regarding inhaler devices through wireless transmission and reception of information regarding the inhaler devices has been studied. For example, Patent Literature 1 below discloses a technology in which a terminal of a store that sells substrates receives, in a wireless manner, identification information of a substrate that a user wants to purchase from the user terminal such as a smartphone, and the terminal of the store specifies, on the basis of the received identification information, the position of the substrate that the user wants to purchase on the display shelves.

CITATION LIST

Patent Literature

Patent Literature 1: Japanese Patent No. 6691138

SUMMARY OF INVENTION

Technical Problem

However, in the technology described in Patent Literature 1 above, a smartphone is operated to transmit the identification information, so that it takes time and effort.

The present invention has been made in light of the problem described above. An object of the present invention is to provide a mechanism that can further improve usability.

Solution to Problem

In order to solve the above-described problem, according to a certain aspect of the present invention, there is provided an inhaler device that generates, using a substrate, an aerosol to be inhaled by a user. The inhaler device includes a memory that stores information, a communicator that receives information from another device in a case where a first condition is met, and a controller that causes the memory to store information received from the other device in a case where a second condition is met.

The first condition may include wireless communication being established between the inhaler device and the other device.

The second condition may include wireless communication being disconnected and thereafter re-established between the inhaler device and the other device.

The second condition may include a predetermined user operation being performed on at least any one of the inhaler device or the other device.

Wireless communication performed between the inhaler device and the other device may be short-range wireless communication.

The short-range wireless communication may be near field communication (NFC).

The inhaler device may temporarily store, with a time limit imposed, the information received from the other device in a case where the first condition is met, reset the time limit added to the information temporarily stored and received from the other device in a case where the second condition is met before the time limit expires, and delete the information temporarily stored and received from the other device in a case where the time limit has expired without the second condition being met.

The inhaler device may store, in a volatile storage medium, the information received from the other device in a case where the first condition is met, and store, in a non-volatile storage medium, the information received from the other device and stored in the volatile storage medium in a case where the second condition is met.

The information received from the other device may include identification information of the substrate.

The information received from the other device may include profile information indicating a profile in which an operation is defined that the inhaler device performs to heat the substrate in order to generate the aerosol.

The profile information may be identification information indicating the profile.

The information received from the other device may include identification information indicating a combination of identification information of the substrate and profile information indicating a profile in which an operation is defined that the inhaler device performs to heat the substrate in order to generate the aerosol.

The information received from the other device may include path information indicating a path along which the information received from the other device has been transmitted or received.

The path information may include identification information indicating the inhaler device, through which the information received from the other device has been routed.

The path information may include identification information indicating the user, who uses the inhaler device, through which the information received from the other device has been routed.

The information received from the other device may include number-of-times information representing a number of times the information received from the other device has been transmitted or received.

The number-of-times information may include a number of inhaler devices through which the information received from the other device has been routed.

The number-of-times information may include a number of users who use inhaler devices through which the information received from the other device has been routed.

In order to solve the above-described problem, according to another aspect of the present invention, there is provided a system including a plurality of inhaler devices that generate, using substrates, aerosols to be inhaled by users. An inhaler device among the inhaler devices receives information from another inhaler device among the inhaler devices in a case where a first condition is met, and the inhaler device stores the information received from the other inhaler device in a case where a second condition is met.

In order to solve the above-described problem, according to another aspect of the present invention, there is provided a non-transitory computer readable medium having a program stored therein, the program for causing a computer that controls an inhaler device that generates, using a substrate, an aerosol to be inhaled by a user to execute: receiving information from another device in a case where a first condition is met, and storing the information received from the other device in a case where a second condition is met.

Advantageous Effects of Invention

As described above, according to the present invention, a mechanism is provided that can further improve usability.

DESCRIPTION OF EMBODIMENTS

Figure 1:
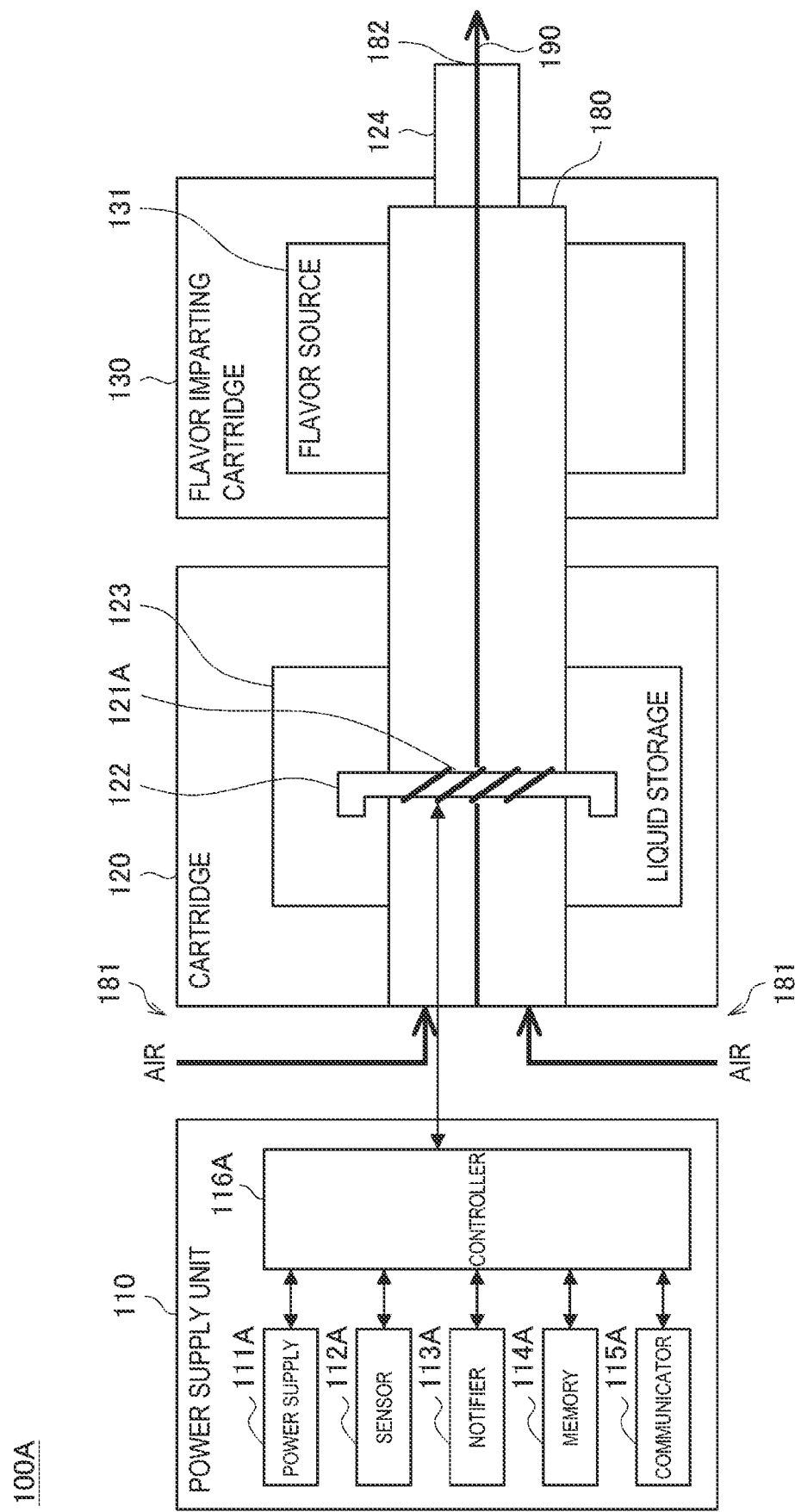
FIG. 1 is a schematic diagram of an inhaler device according to a first configuration example.

Preferable embodiments of the present invention will be described in detail below with reference to the attached drawings. Note that, in the present specification and the drawings, structural elements having substantially the same functional configurations will be denoted by the same reference numerals to omit redundant description.

Moreover, in the present specification and drawings, elements having substantially the same functional configurations may be differentiated by adding alphabets after the same reference numerals. For example, a plurality of elements having substantially the same functional configurations are differentiated as needed as in inhaler devices 100A and 100B. Note that in a case where the plurality of elements having substantially the same functional configurations do not have to be differentiated, the plurality of elements having substantially the same functional configurations are denoted only by the same reference numerals. For example, in a case where the inhaler devices 100A and 100B do not have to be differentiated from each other, the inhaler devices 100A and 100B are simply referred to as inhaler devices 100.

1. CONFIGURATION EXAMPLE OF INHALER DEVICE

An inhaler device generates material to be inhaled by a user. In the example described below, the material generated by the inhaler device is an aerosol. Alternatively, the material generated by the inhaler device may be gas.

(1) First Configuration Example

FIG. 1 is a schematic diagram of the inhaler device according to the first configuration example. As illustrated in FIG. 1, an inhaler device 100A according to the present configuration example includes a power supply unit 110, a cartridge 120, and a flavor imparting cartridge 130. The power supply unit 110 includes a power supply 111A, a sensor 112A, a notifier 113A, a memory 114A, a communicator 115A, and a controller 116A. The cartridge 120 includes a heater 121A, a liquid guide 122, and a liquid storage 123. The flavor imparting cartridge 130 includes a flavor source 131 and a mouthpiece 124. In the cartridge 120 and the flavor imparting cartridge 130, an airflow path 180 is defined.

The power supply 111A stores electric power. The power supply 111A supplies electric power to the structural elements of the inhaler device 100A under the control of the controller 116A. The power supply 111A may be a rechargeable battery such as a lithium ion secondary battery.

The sensor 112A acquires various items of information regarding the inhaler device 100A. In an example, the sensor 112A may be a pressure sensor such as a microphone condenser, a flow sensor, or a temperature sensor, and acquire a value generated in accordance with the user's inhalation. In another example, the sensor 112A may be an input device that receives information input by the user, such as a button or a switch.

The notifier 113A provides information to the user. The notifier 113A may be a light-emitting device that emits light, a display device that displays an image, a sound output device that outputs sound, or a vibration device that vibrates.

The memory 114A stores various items of information for operation of the inhaler device 100A. The memory 114A may be a non-volatile storage medium such as flash memory.

The communicator 115A is a communication interface capable of communication in conformity with any wired or wireless communication standard. Such a communication standard may be, for example, Wi-Fi (registered trademark) or Bluetooth (registered trademark).

The controller 116A functions as an arithmetic processing unit and a control circuit, and controls the overall operations of the inhaler device 100A in accordance with various programs. The controller 116A includes an electronic circuit such as a central processing unit (CPU) and a microprocessor, for example.

The liquid storage 123 stores an aerosol source. The aerosol source is atomized to generate an aerosol. The aerosol source is a liquid such as polyhydric alcohol and water. Examples of the polyhydric alcohol include glycerine and propylene glycol. The aerosol source may include a flavor component that is either derived from tobacco or not derived from tobacco. For the inhaler device 100A that is a medical inhaler such as a nebulizer, the aerosol source may include a medicine.

The liquid guide 122 guides, from the liquid storage 123, the aerosol source that is the liquid stored in the liquid storage 123, and holds the aerosol source. The liquid guide 122 is, for example, a wick formed by twining fiber material such as glass fiber or porous material such as porous ceramic. In this case, the capillary action of the wick guides the aerosol source stored in the liquid storage 123.

The heater 121A heats the aerosol source to atomize the aerosol source and generate the aerosol. In the example illustrated in FIG. 1, the heater 121A includes a coil wound around the liquid guide 122. When the heater 121A produces heat, the aerosol source held by the liquid guide 122 is heated and atomized to generate the aerosol. The heater 121A produces heat when receiving electric power from the power supply 111A. In an example, the electric power may be supplied in response to the sensor 112A detecting a start of the user's inhalation and/or an input of predetermined information. Subsequently, the supply of the electric power may be stopped in response to the sensor 112A detecting an end of the user's inhalation and/or an input of predetermined information.

The flavor source 131 is a structural element for imparting a flavor component to the aerosol. The flavor source 131 may include a flavor component that is either derived from tobacco or not derived from tobacco.

The airflow path 180 is a flow path of air to be inhaled by the user. The airflow path 180 has a tubular structure having an air inlet hole 181 and an air outlet hole 182 at both ends. The air inlet hole 181 is an inlet of air into the airflow path 180, and the air outlet hole 182 is an outlet of the air from the airflow path 180. The liquid guide 122 is on the airflow path 180 at an upstream position (closer to the air inlet hole 181), and the flavor source 131 is on the airflow path 180 at a downstream position (closer to the air outlet hole 182). Air flowing in through the air inlet hole 181 when the user inhales mixes with the aerosol generated by the heater 121A. Subsequently, as indicated by an arrow 190, the mixture fluid of the aerosol and the air passes through the flavor source 131 and is conveyed to the air outlet hole 182. When the mixture fluid of the aerosol and the air passes through the flavor source 131, the flavor component included in the flavor source 131 is imparted to the aerosol.

The mouthpiece 124 is to be held in a mouth of the user during inhalation. The mouthpiece 124 has the air outlet hole 182. When the user inhales with the mouthpiece 124 in his/her mouth, the mixture fluid of the aerosol and the air enters the oral cavity of the user.

The configuration example of the inhaler device 100A has been described above. The inhaler device 100A is not limited to the above configuration, and may be configured in various ways as exemplified below.

In an example, the inhaler device 100A does not have to include the flavor imparting cartridge 130. In this case, the cartridge 120 includes the mouthpiece 124.

In another example, the inhaler device 100A may include various types of aerosol sources. Still another type of aerosol may be generated by mixing a plurality of types of aerosols generated from the plurality of types of aerosol sources in the airflow path 180 and causing a chemical reaction.

In addition, means for atomizing the aerosol source is not limited to heating by the heater 121A. For example, the means for atomizing the aerosol source may be vibration atomization or induction heating.

(2) Second Configuration Example

Figure 2:
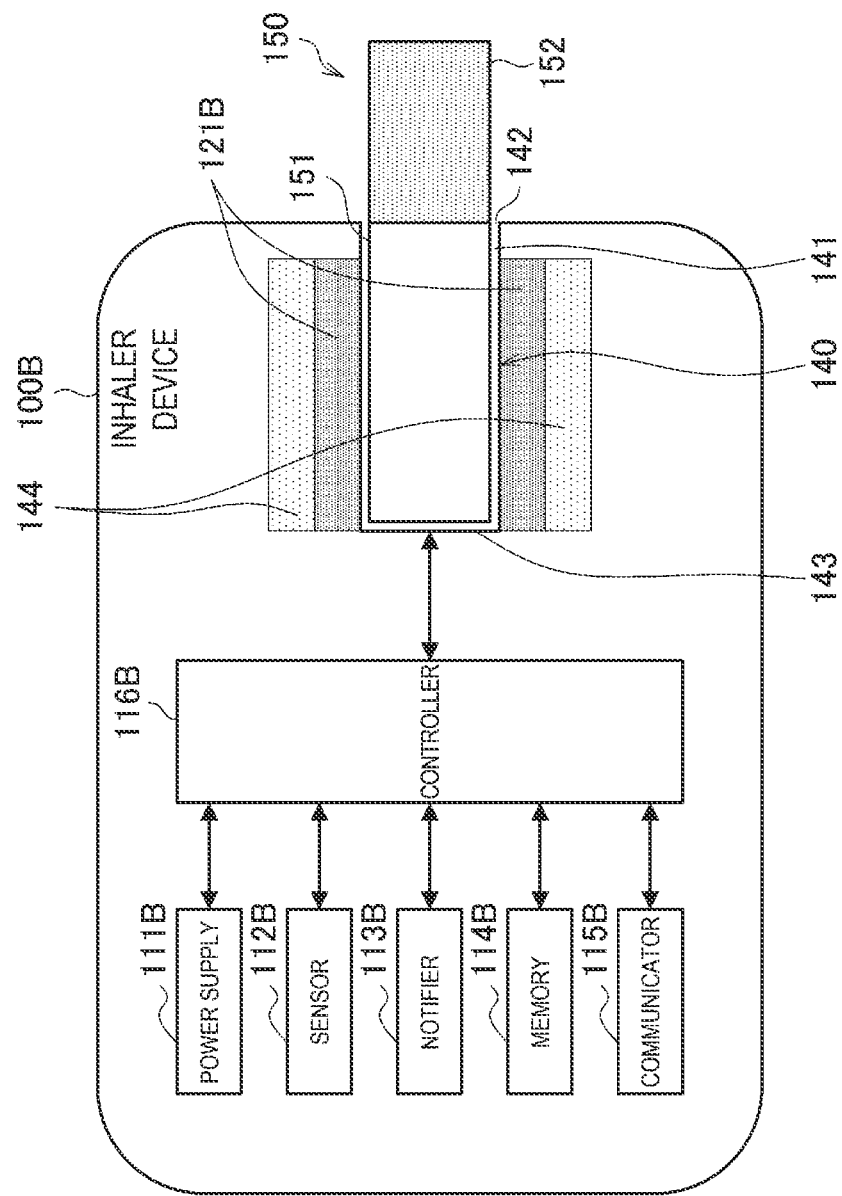
FIG. 2 is a schematic diagram of an inhaler device according to a second configuration example.

FIG. 2 is a schematic diagram of the inhaler device according to the second configuration example. As illustrated in FIG. 2, an inhaler device 100B according to the present configuration example includes a power supply 111B, a sensor 112B, a notifier 113B, a memory 114B, a communicator 115B, a controller 116B, a heater 121B, a holder 140, and a heat insulator 144.

The power supply 111B, the sensor 112B, the notifier 113B, the memory 114B, the communicator 115B, and the controller 116B are substantially the same as the respective corresponding structural elements included in the inhaler device 100A according to the first configuration example.

The holder 140 has an internal space 141, and holds a stick substrate 150 in a manner partially accommodated in the internal space 141. The holder 140 has an opening 142 that allows the internal space 141 to communicate with outside. The holder 140 holds the stick substrate 150 that is inserted into the internal space 141 through the opening 142. For example, the holder 140 may be a tubular body having the opening 142 and a bottom 143 on its ends, and may define the pillar-shaped internal space 141. The holder 140 has the function of defining a flow path of air to be supplied to the stick substrate 150. For example, the bottom 143 has an air inlet hole that is an inlet of air into the flow path. In contrast, the opening 142 is an air outlet hole that is an outlet of the air from the flow path.

The stick substrate 150 includes a substrate 151 and an inhalation port 152. The substrate 151 includes an aerosol source. Note that, in the present configuration example, the aerosol source does not have to be liquid and may also be solid. The stick substrate 150 held by the holder 140 includes the substrate 151 at least partially accommodated in the internal space 141 and the inhalation port 152 at least partially protruding from the opening 142. When the user inhales with the inhalation port 152 protruding from the opening 142 in his/her mouth, air flows into the internal space 141 from an air inlet hole (not illustrated), and the air and an aerosol generated from the substrate 151 reach inside the mouth of the user.

The heater 121B has the substantially the same configuration as the heater 121A according to the first configuration example. Note that, in the example illustrated in FIG. 2, the heater 121B has a film-like shape and surrounds the outer circumference of the holder 140. Subsequently, heat produced from the heater 121B heats the substrate 151 of the stick substrate 150 from the outer circumference, generating the aerosol.

The heat insulator 144 prevents heat from transferring from the heater 121B to the other structural elements. For example, the heat insulator 144 may be a vacuum heat insulator or an aerogel heat insulator.

The configuration example of the inhaler device 100B has been described above. The inhaler device 100B is not limited to the above configuration, and may be configured in various ways as exemplified below.

In an example, the heater 121B may have a blade-like shape, and may be disposed so that the heater 121B protrudes from the bottom 143 of the holder 140 toward the internal space 141. In this case, the heater 121B having the blade-like shape is inserted into the substrate 151 of the stick substrate 150 and heats the substrate 151 of the stick substrate 150 from its inside. In another example, the heater 121B may be disposed so that the heater 121B covers the bottom 143 of the holder 140. In still another example, the heater 121B may be implemented as a combination of two or more selected from a first heater that covers the outer circumference of the holder 140, a second heater having the blade-like shape, and a third heater that covers the bottom 143 of the holder 140.

In another example, the holder 140 may include an opening/closing mechanism that at least partially opens and closes an outer shell defining the internal space 141. Examples of the opening/closing mechanism include a hinge. In addition, the holder 140 may sandwich the stick substrate 150 inserted into the internal space 141 by opening and closing the outer shell. In this case, the heater 121B may be at the sandwiching position of the holder 140 and may produce heat while pressing the stick substrate 150.

In addition, means for atomizing the aerosol source is not limited to heating by the heater 121B. For example, the means for atomizing the aerosol source may be induction heating.

In addition, the inhaler device 100B may also include the heater 121A, the liquid guide 122, the liquid storage 123, and the airflow path 180 according to the first configuration example. The air outlet hole 182 for the airflow path 180 may also function as an air inlet hole into the internal space 141. In this case, a mixture fluid of the air and an aerosol generated by the heater 121A flows into the internal space 141, mixes further with an aerosol generated by the heater 121B, and then reaches the oral cavity of the user.

2. TECHNICAL FEATURES

2.1. System Configuration Example

Figure 3:
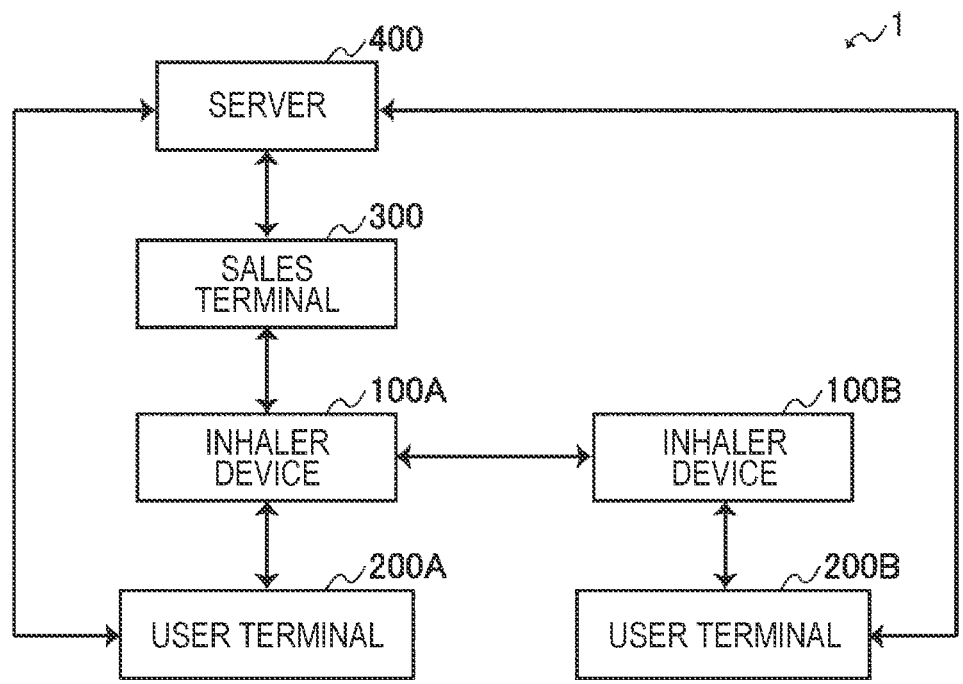
FIG. 3 is a diagram illustrating an example of the configuration of a sales system according to the present embodiment.

FIG. 3 is a diagram illustrating an example of the configuration of a sales system 1 according to the present embodiment. As illustrated in FIG. 3, the sales system 1 includes inhaler devices 100, user terminals 200, a sales terminal 300, and a server 400. Note that FIG. 3 illustrates an example in which the sales system 1 has two inhaler devices 100 (100A and 100B), two user terminals 200 (200A and 200B), one sales terminal 300, and one server 400. However, for each device included in the sales system 1, the number of devices is not limited to the number mentioned in the example.

(1) Configuration of Inhaler Device 100

An inhaler device generates material to be inhaled by a user. In the example described below, the material generated by the inhaler device is an aerosol. Alternatively, the material generated by the inhaler device may be gas. In the following, the material generated by the inhaler device being inhaled by the user is also referred to as "inhalation" or "puffing".

Each inhaler device 100 according to the present embodiment generates an aerosol to be inhaled by the user using a substrate. A heater 121 is an example of a generator that generates an aerosol. The cartridge 120 and the flavor imparting cartridge 130 in the first configuration example and the stick substrate 150 in the second configuration example are examples of the substrate according to the present invention. The inhaler device 100 generates an aerosol using a substrate attached to the inhaler device 100. The cartridge 120 and the flavor imparting cartridge 130 connected to the power supply unit 110 in the first configuration example are an example of the substrate attached to the inhaler device 100. The stick substrate 150 inserted into the inhaler device 100 in the second configuration example is an example of the substrate attached to the inhaler device 100.

The inhaler device 100 may have any one of the first configuration example or the second configuration example described above. In FIG. 3, the inhaler device 100 used by a user A will be referred to as the inhaler device 100A, and the inhaler device 100 used by a user B will be referred to as the inhaler device 100B. That is, the configuration of the inhaler device 100A in FIG. 3 does not always have to match the configuration illustrated in FIG. 1 and may match the configuration illustrated in FIG. 2, for example. Similarly, the configuration of the inhaler device 100B in FIG. 3 does not always have to match the configuration illustrated in FIG. 2 and may match the configuration illustrated in FIG. 1, for example.

In particular, a communicator 115 according to the present embodiment may perform wireless communication based on short-range wireless communication standards, which are near field communication (NFC) or Bluetooth (registered trademark).

(2) Configuration of User Terminal 200

Each user terminal 200 is a terminal device used by the user of an inhaler device 100. For example, the user terminal 200 is implemented as a smartphone, a tablet computer, a wearable device, or the like. An inhaler device 100 and a user terminal 200 used by the same user are associated with each other. For example, the user registers information regarding the inhaler device 100 in the user terminal 200, registers information regarding the user terminal 200 in the inhaler device 100, or registers, in the server 400, the inhaler device 100 and user terminal 200 being used by the same user. In the following, the configuration of the user terminal 200 will be described with reference to FIG. 4.

Figure 4:
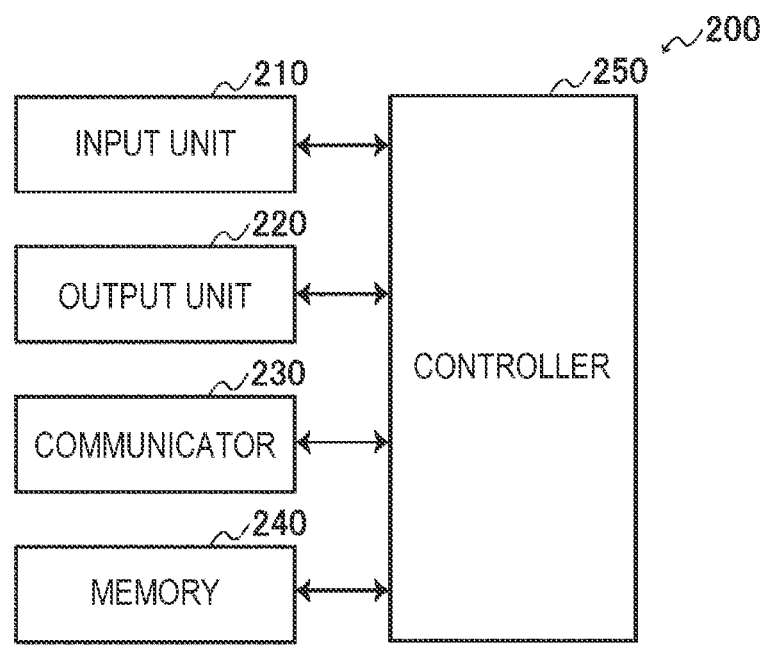
FIG. 4 is a block diagram illustrating an example of the configuration of a user terminal according to the present embodiment.

FIG. 4 is a block diagram illustrating an example of the configuration of the user terminal 200 according to the present embodiment. As illustrated in FIG. 4, the user terminal 200 includes an input unit 210, an output unit 220, a communicator 230, a memory 240, and a controller 250.

The input unit 210 has the function of receiving various items of information that are input. The input unit 210 may include an input device that receives information input by the user. Examples of the input device include a button, a keyboard, a touch screen, and a microphone. The input unit 210 may further include various sensors such as an image sensor.

The output unit 220 has the function of outputting information. The output unit 220 may include an output device that outputs information to the user. Examples of the output device include a display device that displays information, a light-emitting device that emits light, a vibration device that vibrates, and a sound output device that outputs sound. An example of the display device is a display. An example of the light-emitting device is a light emitting diode (LED). An example of the vibration device is an eccentric motor. An example of the sound output device is a speaker. The output unit 220 provides information to the user by outputting information input from the controller 250.

The communicator 230 is a communication interface for transmitting and receiving information between the user terminal 200 and other devices. The communicator 230 performs communication based on any wired or wireless communication standard. As such a communication standard, for example, a wireless local area network (LAN), a wired LAN, Wi-Fi (registered trademark), or Bluetooth (registered trademark) may be used. In particular, the communicator 230 may perform wireless communication based on a short-range wireless communication standard such as near field communication (NFC) or Bluetooth (registered trademark).

The memory 240 stores various items of information for operation of the user terminal 200. The memory 240 may be a non-volatile storage medium such as a flash memory.

The controller 250 functions as an arithmetic processing unit and a control circuit, and controls the overall operations of the user terminal 200 in accordance with various programs. The controller 250 includes an electronic circuit such as a CPU and a microprocessor, for example. The controller 250 may further include a read only memory (ROM) and a random access memory (RAM). The ROM stores, for example, programs and operation parameters to be used. The RAM temporarily stores, for example, parameters that change as appropriate. The user terminal 200 performs various types of processing under control performed by the controller 250. Processing of information input by the input unit 210, output of information using the output unit 220, transmission and reception of information using the communicator 230, and storage of information in the memory 240 and reading out information from the memory 240 are examples of processing controlled by the controller 250. Other types of processing performed by the user terminal 200 are also controlled by the controller 250. Examples of the other types of processing include input of information to various structural elements and processing based on information output from various structural elements.

Note that the functions of the controller 250 may be realized using applications. The applications may be preinstalled or downloaded. In another example, the functions of the controller 250 may also be realized using progressive web apps (PWA).

(3) Configuration of Sales Terminal 300

The sales terminal 300 is a terminal device that performs processing for selling substrates. The sales terminal 300 may be implemented as, for example, a cash register or a point-of-sale (POS) terminal. In this case, the sales terminal 300 is installed in a store that sells substrates. Examples of processing for selling substrates include payment processing regarding the giving and receiving of money and sales management processing for registering, for example, the brands of substrates that were sold and the number of sales of the substrates. A user who uses the sales terminal 300 is typically a salesperson. In the following, the configuration of the sales terminal 300 will be described with reference to FIG. 5.

Figure 5:
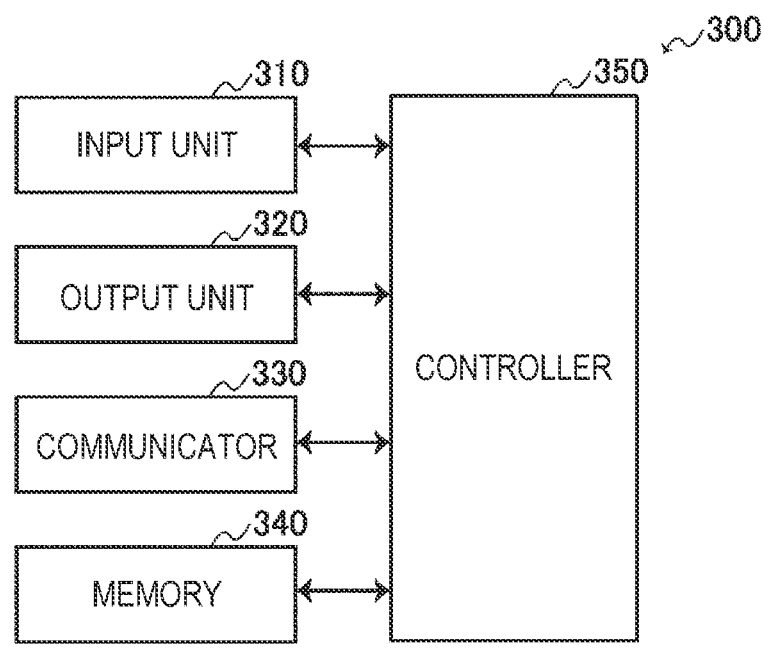
FIG. 5 is a block diagram illustrating an example of the configuration of a sales terminal according to the present embodiment.

FIG. 5 is a block diagram illustrating an example of the configuration of the sales terminal 300 according to the present embodiment. As illustrated in FIG. 5, the sales terminal 300 includes an input unit 310, an output unit 320, a communicator 330, a memory 340, and a controller 350.

The input unit 310 has the function of receiving various items of information that are input. The input unit 310 may include an input device that receives information input by a salesperson. Examples of the input device include a button, a keyboard, a touch screen, and a microphone. The input unit 310 may further include various sensors such as an image sensor.

The output unit 320 has the function of outputting information. The output unit 320 may include an output device that outputs information to the salesperson. Examples of the output device include a display device that displays information, a light-emitting device that emits light, a vibration device that vibrates, and a sound output device that outputs sound. An example of the display device is a display. An example of the light-emitting device is an LED. An example of the vibration device is an eccentric motor. An example of the sound output device is a speaker. The output unit 320 provides information to the salesperson by outputting information input from the controller 350.

The communicator 330 is a communication interface for transmitting and receiving information between the sales terminal 300 and other devices. The communicator 330 performs communication based on any wired or wireless communication standard. As such a communication standard, for example, a wireless LAN, a wired LAN, or Wi-Fi (registered trademark) may be used. In particular, the communicator 330 may perform wireless communication based on a short-range wireless communication standard such as near field communication (NFC) or Bluetooth (registered trademark).

The memory 340 stores various items of information for operation of the sales terminal 300. The memory 340 may be a non-volatile storage medium such as a flash memory.

The controller 350 functions as an arithmetic processing unit and a control circuit, and controls the overall operations of the sales terminal 300 in accordance with various programs. The controller 350 includes an electronic circuit such as a CPU and a microprocessor, for example. The controller 350 may further include a ROM and a RAM. The ROM stores, for example, programs and operation parameters to be used. The RAM temporarily stores, for example, parameters that change as appropriate. The sales terminal 300 performs various types of processing under control performed by the controller 350. Processing of information input by the input unit 310, output of information using the output unit 320, transmission and reception of information using the communicator 330, and storage of information in the memory 340 and reading out information from the memory 340 are examples of processing controlled by the controller 350. Other types of processing performed by the sales terminal 300 are also controlled by the controller 350. Examples of the other types of processing include input of information to various structural elements and processing based on information output from various structural elements.

Note that the functions of the controller 350 may be realized using applications. The applications may be preinstalled or downloaded. In another example, the functions of the controller 350 may also be realized using progressive web apps (PWA).

(4) Configuration of Server 400

The server 400 is an information processing apparatus that provides various types of services regarding the inhaler devices 100. In an example, the server 400 provides membership services to the users of the inhaler devices 100. The server 400 collects and accumulates information regarding each inhaler device 100, analyzes the accumulated information, and provides membership services in accordance with the analysis result. For example, the user accesses the server 400 to apply for a membership registration in advance, so that the user can receive various types of membership services such as provision of information regarding the inhaler device 100. In the following, the configuration of the server 400 will be described with reference to FIG. 6.

Figure 6:
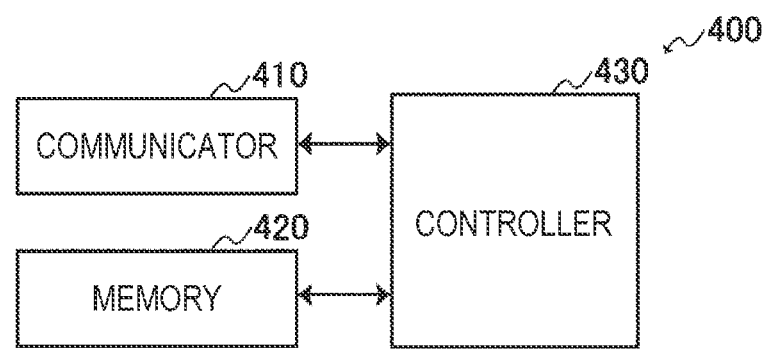
FIG. 6 is a block diagram illustrating an example of the configuration of a server according to the present embodiment.

FIG. 6 is a block diagram illustrating an example of the configuration of the server 400 according to the present embodiment. As illustrated in FIG. 6, the server 400 includes a communicator 410, a memory 420, and a controller 430.

The communicator 410 is a communication interface for transmitting and receiving information between the server 400 and other devices. The communicator 410 communicates with the other devices via the Internet, for example.

The memory 420 stores various items of information for operation of the server 400. The memory 420 may be a non-volatile storage medium such as a hard disc drive (HDD) or a solid state drive (SSD).

The controller 430 functions as an arithmetic processing unit and a control circuit, and controls the overall operations of the server 400 in accordance with various programs. The controller 430 includes an electronic circuit such as a CPU and a microprocessor, for example. The controller 430 may further include a ROM and a RAM. The ROM stores, for example, programs and operation parameters to be used. The RAM temporarily stores, for example, parameters that change as appropriate. The server 400 performs various types of processing under control performed by the controller 430. Transmission and reception of information using the communicator 410, and storage of information in the memory 420 and reading out information from the memory 420 are examples of processing controlled by the controller 430. Other types of processing performed by the server 400 are also controlled by the controller 430. Examples of the other types of processing include input of information to various structural elements and processing based on information output from various structural elements.

2.2. Processing Regarding Inter-Device Communication

As illustrated in FIG. 3, communication may be performed between the devices included in the sales system 1. For example, the inhaler device 100A can communicate with the user terminal 200A, which is used by the same user, the inhaler device 100B, which is another device used by another user, and the sales terminal 300. Each user terminal 200 can communicate with the inhaler device 100 used by the same user and the server 400. The sales terminal 300 can communicate with the inhaler devices 100 and the server 400. The server 400 can communicate with the sales terminal 300 and the user terminals 200.

(1) Information Stored in Inhaler Device 100

Each inhaler device 100 stores information received from other devices and transmits stored information to other devices. An example of information stored in the inhaler device 100 will be described in the following.

Brand Information

The inhaler device 100 may store identification information of a substrate. The identification information of the substrate is information for identifying the brand (that is, a kind) of the substrate. In the following, the identification information of the substrate will also be referred to as brand information. As will be described below, the brand information stored in the inhaler device 100 is transmitted to the sales terminal 300 and is treated as information indicating a brand that the user wants to purchase. Since the inhaler device 100 stores the brand information, it is thus possible to improve usability at the time of purchase of the substrate.

Profile Information

The inhaler device 100 may store profile information indicating a profile in which an operation is defined that the inhaler device 100 performs to heat a substrate in order to generate an aerosol. The inhaler device 100 heats a substrate in accordance with the profile indicated by the stored profile information to generate an aerosol.

A profile in the first configuration example is information in which an electric power supply time to the heater 121A and an electric power supply amount per unit time (for example, a voltage) are defined. The controller 116A performs control such that the power supply amount per unit time defined in the profile is supplied from the power supply 111A to the heater 121A for the power supply time defined in the profile. Such electric power supply control is performed, for example, every time puffing is detected.

A profile in the second configuration example is information in which a relationship between the time that has elapsed from when the heater 121B starts heating and the temperature of the heater 121B is defined. The controller 116B controls the heater 121B such that a temperature change similar to that in the profile is realized in the heater 121B. The heater 121B may include a conductive track including a resistor, and the sensor 112B may detect the temperature of the heater 121B on the basis of the electrical resistance of the conductive track. The heater 121B may be controlled by controlling, for example, electric power supply from the power supply 111B to the heater 121B. Control of power supply may be performed under, for example, pulse width modulation (PWM) control.

The profile information may be the profile itself. Regarding the profile, a settable profile may be predetermined, which is for example provided through the membership services. In this case, the profile information may be identification information indicating the profile. The identification information indicating the profile has a smaller data amount than the profile itself, and thus a communication load can be reduced when data is transmitted to or received from other devices. In addition, the profile may be a customizable profile, in which the user can adjust for example a parameter such as an electric power supply time.

Combination of Brand Information and Profile Information

The inhaler device 100 may store brand information and profile information such that the brand information and the profile information are associated with each other. For example, the profile the user prefers may differ on a substrate basis, and the inhaler device 100 may store brand information and a profile suitable for a substrate of the brand indicated by the brand information such that the brand information and the profile are associated with each other. In this case, the inhaler device 100 may store identification information indicating a combination of the brand information and the profile information. By designing the data amount of the identification information indicating the combination of the brand information and the profile information to be smaller than the sum of the data amount of the brand information and the data amount of the profile information, a communication load can be reduced when data is transmitted to or received from other devices. An example of the identification information indicating the combination of the brand information and the profile information will be illustrated in Table 1 below.

TABLE 1

Example of identification information indicating combination of brand information and profile information

| identification information | brand information | profile information | ... |
|---|---|---|---|
| 0001 | brand_X | P | ... |
| 0002 | brand_X | Q | ... |
| 0003 | brand_Y | P | ... |
| ... | ... | ... | ... |

Device ID

The inhaler device 100 may store the identification information of the inhaler device 100. The identification information of the inhaler device 100 is information for uniquely identifying the inhaler device 100. The identification information of the inhaler device 100 will also be referred to as a device ID in the following.

User ID

The inhaler device 100 may store the identification information of the user who uses the inhaler device 100. The identification information of the user is information for uniquely identifying the user. The identification information of the user will also be referred to as a user ID in the following. The user ID may be personal information such as the name of the user or may also be an account name registered in the membership services.

Authentication Information

The inhaler device 100 may store authentication information. The authentication information is information indicating that the user is entitled to purchase substrates. The authentication information includes, for example, information that proves the age of the user.

Information Indicating Copy History of Copy Target Information

The inhaler device 100 directly or indirectly transmits information to and receives information from other inhaler devices 100. In the following, direct or indirect transmission and reception of information between inhaler devices 100, that is, information stored in one of two inhaler devices 100 being received by and stored in the other inhaler device 100 will also be referred to as copy. Moreover, in the following, information included in items of information stored in the inhaler device 100 and transmitted to or received from other inhaler devices 100, that is, information transmitted or received via a plurality of inhaler devices 100 will also be referred to as copy target information.

The copy target information may include brand information. Brand information, as will be described later, is handled by the sales terminal 300 as information indicating a brand that is desired to be purchased. Thus, it becomes possible for users to recommend their favorite brands to each other and purchase substrates of the recommended brands.

The copy target information may include profile information. In this case, it becomes possible for users to recommend their favorite profiles to each other and cause the inhaler devices 100 to perform heating in accordance with the recommended profiles.

As copy target information, brand information and profile information may be associated with each other and then transmitted and received. For example, the copy target information may include identification information indicating a combination of the brand information and the profile information. With such a configuration, users can recommend their favorite combinations of brands and profiles to each other and try the recommended brands by performing heating in accordance with the recommended profiles.

The inhaler device 100 may store information indicating the copy history of copy target information. The information indicating the copy history is copied together with the copy target information and is updated. Examples of the information indicating the copy history include path information and number-of-times information.

Path Information

The inhaler device 100 may store path information indicating a path along which copy target information has been transmitted or received. The path information is updated in the process of performing transmission or reception via a plurality of inhaler devices 100.

The path information may include the device IDs of the inhaler devices 100 through which the copy target information has been routed. For example, in a case where copy target information is copied from the inhaler device 100B to the inhaler device 100A, the path information includes the device ID of the inhaler device 100B and the device ID of the inhaler device 100A. With such a configuration, the path information makes it possible to grasp the history of inhaler devices 100 that have copied the copy target information.

The path information may include the user IDs of the users who use the inhaler devices 100 through which the copy target information has been routed. For example, in a case where copy target information is copied from the inhaler device 100B to the inhaler device 100A, the path information includes the user ID of the user B and the user ID of the user A. In contrast, in a case where copy target information is copied between a plurality of inhaler devices 100 owned by one user, the path information is not updated. With such a configuration, the path information makes it easy to grasp the history of users who have copied the copy target information.

Number-of-Times Information

The inhaler device 100 may store number-of-times information indicating the number of times copy target information has been transmitted or received. The number-of-times information is updated in the process of performing transmission or reception via a plurality of inhaler devices 100.

The number-of-times information may include the number of inhaler devices 100 through which the copy target information has been routed. For example, in a case where copy target information is copied from the inhaler device 100B to the inhaler device 100A, the number-of-times information is incremented (that is, one is added to the number-of-times information obtained so far). With such a configuration, the number-of-times information makes it possible to grasp the number of times the copy target information has been copied.

The number-of-times information may include the number of users who use the inhaler devices 100 through which the copy target information has been routed. For example, in a case where copy target information is copied from the inhaler device 100B to the inhaler device 100A, the number-of-times information is incremented since the copy target information is copied from the user B to the user A. In contrast, in a case where copy target information is copied between a plurality of inhaler devices 100 owned by one user, the number-of-times information is not incremented. With such a configuration, the number-of-times information makes it easy to grasp the number of users who have copied the copy target information. Moreover, in a case where a membership service is provided through which points are given in accordance with the number of times copy target information has been copied between users, fraud can be eliminated in which points are obtained by repeatedly performing copying between a plurality of inhaler devices 100 owned by the same user.

Supplementary Description

Note that, for each information described above, the inhaler device 100 may store one item of information or a plurality of items of information. For example, the inhaler device 100 may store one or more items of brand information and one or more items of profile information.

(2) Update of Information Stored in Inhaler Device 100

Each inhaler device 100 receives information from other devices and stores the information. In particular, the inhaler device 100 receives information through short-range wireless communication. The short-range wireless communication may be NFC.

In one example, the inhaler device 100 may have an NFC tag. An NFC tag is a tag having an antenna for performing communication using NFC and an integrated circuit (IC) chip for performing processing for communication using NFC and is typically formed so as to have a thin seal-like shape. Information can be written into or read out from an NFC tag using NFC. That is, the NFC tag of the inhaler device 100 may function as a memory 114, the communicator 115, and the controller 116. In order to write information into and read out information from the NFC tag, an NFC reader/writer is used. An NFC reader/writer is a device that functions both as an NFC reader capable of reading out information from an NFC tag and an NFC writer capable of writing information into an NFC tag.

In another example, the inhaler device 100 may have an NFC communication module. The NFC communication module is a communication module capable of performing communication using NFC and supports three communication modes, which are a card emulation mode, a reader-writer mode, and a peer-to-peer (P2P) mode. When the NFC communication module operates in the card emulation mode, the NFC communication module operates as an NFC tag itself, so that an NFC reader/writer performs reading and writing on the NFC communication module. When the NFC communication module operates in the reader-writer mode, the NFC communication module operates as an NFC reader/writer itself, so that the NFC communication module performs reading and writing on an NFC tag. When the NFC communication module operates in the P2P mode, the NFC communication module communicates with other NFC communication modules operating in the P2P mode.

Management Performed by User Terminal 200

Each user terminal 200 manages information stored in the inhaler device 100. In one example, the user terminal 200 achieves synchronization between the user terminal 200 and the inhaler device 100. More specifically, the user terminal 200 writes information into the inhaler device 100 or reads out information from the inhaler device 100 so that the information stored in the inhaler device 100 and the information stored in the user terminal 200 become equal to each other. In the following, information for which synchronization is to be achieved in this manner will also be referred to as synchronization target information. The function of managing information stored in the inhaler device 100 can be realized by a dedicated application (hereinafter also referred to as a management application).

The user terminal 200 performs communication to achieve synchronization between the user terminal 200 and the inhaler device 100 in a case where predetermined conditions are met. The predetermined conditions may include the distance between the user terminal 200 and the inhaler device 100 becoming small enough to perform short-range wireless communication. The predetermined conditions may include the management application being active in the user terminal 200. The predetermined conditions may include synchronization target information stored in the user terminal 200 being different from the information stored in the inhaler device 100.

Note that the user terminal 200 can detect, by periodically performing polling, inhaler devices 100 present in a range where short-range wireless communication is possible. In a case where the user terminal 200 detects, by performing polling, an inhaler device 100 present in the range where short-range wireless communication is possible, the user terminal 200 may start up the management application. Subsequently, after being started up, the management application may automatically achieve synchronization between the user terminal 200 and the inhaler device 100.

Typically, the user terminal 200 manages information stored in the inhaler device 100 associated with the user terminal 200 (that is, the inhaler device 100 used by the same user). For example, the user terminal 200A manages information stored in the inhaler device 100A.

Update Due to Other Inhaler Devices 100

Each inhaler device 100 may receive information from other inhaler devices 100 and store the information. For example, the inhaler device 100 may receive copy target information from other inhaler devices 100 and store the copy target information.

The inhaler device 100 performs communication to transmit copy target information to or receive copy target information from another inhaler device 100 in a case where predetermined conditions are met. The predetermined conditions may include the distance between the inhaler devices 100 becoming small enough to perform short-range wireless communication.

Reception Confirmation Operation Performed by Inhaler Device 100

Each inhaler device 100 receives information from another device (for example, the user terminal 200 or an inhaler device 100) and stores the information. Through wireless communication such as NFC that does not require pairing, undesired information may be written in addition to desired information, so that various inconveniences may occur. For example, in a case where undesired brand information is written into the inhaler device 100, the brand information may be transmitted to the sales terminal 300, and a substrate of the brand that is not desired to be purchased may be purchased.

Thus, the inhaler device 100 allows storage of received information in a case where a certain condition is met. With such a configuration, it is possible to prevent the above-described inconveniences. In the following, such a configuration will be described in detail. Note that another device that transmits information to the inhaler device 100 will also be referred to as a transmission source device in the following.

The inhaler device 100 receives information from a transmission source device in a case where a first condition is met. In a case where the transmission source device is the user terminal 200, information received from the transmission source device is synchronization target information. In a case where the transmission source device is another inhaler device 100, information received from the transmission source device is copy target information. Subsequently, the inhaler device 100 stores the information received from the transmission source device in a case where a second condition is met. In this manner, the inhaler device 100 does not store information when the information is simply received from the transmission source device but stores the information when the second condition is met. This allows the inhaler device 100 to store only desired information in an environment in which undesired information may be received.

Storage performed in a case where the second condition is met is long-term storage. In contrast, the information received in a case where the first condition is met may be temporarily stored.

In one example, the inhaler device 100 may temporarily store, with a time limit imposed, the information received from the transmission source device in a case where the first condition is met. In this case, in a case where the second condition is met before the time limit expires, the inhaler device 100 resets the time limit added to the temporarily stored information received from the transmission source device. In contrast, in a case where the time limit has expired without the second condition being met, the inhaler device 100 deletes the temporarily stored information received from the transmission source device. With such a configuration, whether to keep storing or delete the information received from the transmission source device is switched depending on whether or not the second condition is met before the time limit expires. Thus, it becomes possible to temporarily hold the information received from the transmission source device until the second condition is met.

In one example, the inhaler device 100 may store, in a volatile storage medium, the information received from the transmission source device in a case where the first condition is met. In this case, in a case where the second condition is met, the inhaler device 100 stores, in a non-volatile storage medium, the information received from the transmission source device and stored in the volatile storage medium. An example of the volatile storage medium is a random access memory (RAM). An example of the non-volatile storage medium is a flash memory. With such a configuration, it is possible to temporarily hold the information received from the transmission source device until the second condition is met.

The first condition includes wireless communication being established between the inhaler device 100 and the transmission source device. The inhaler device 100 can receive information from the transmission source device in a case where the inhaler device 100 approaches the transmission source device and enters the range where wireless communication is possible. Wireless communication performed between the inhaler device 100 and the transmission source device is short-range wireless communication. An example of the short-range wireless communication is NFC. The range where NFC communication is possible is on the order of 10 cm. Thus, when the inhaler device 100 approaches so as to be approximately 10 cm from the transmission source device, the inhaler device 100 receives information from the transmission source device. Thus, the user can prevent the inhaler device 100 from receiving undesired information by causing the inhaler device 100 to be 10 cm or more away from the transmission source device. In contrast, the user can cause the inhaler device 100 to receive desired information by causing the inhaler device 100 to approach the transmission source device so as to be within 10 cm of the transmission source device. In the following, the inhaler device 100 and the transmission source device being close to each other such that NFC communication is possible will also be referred to as touching.

The second condition includes NFC communication being disconnected and thereafter re-established between the inhaler device 100 and the transmission source device. In other words, the second condition includes NFC communication being established for the second time between the inhaler device 100 and the transmission source device.

NFC communication may be disconnected in a passive manner for the inhaler device 100. For example, NFC communication performed by the inhaler device 100 may be disconnected by causing the inhaler device 100 to be spaced away from the transmission source device by a distance that is longer than the distance at which NFC communication is possible. After NFC communication is disconnected, in a case where the inhaler device 100 is touched again by the transmission source device, NFC communication is established again. In this case, by causing the inhaler device 100 to be touched by the transmission source device two times, the user can cause the inhaler device 100 to store the information received from the transmission source device.

NFC communication may be disconnected in an active manner by the inhaler device 100. For example, the inhaler device 100 may disconnect NFC communication in a case where the first condition is met and copy target information is received. In a case where the inhaler device 100 is continuously touched by the transmission source device even after NFC communication is disconnected, NFC communication is established again. In this case, by causing the inhaler device 100 to be continuously touched by the transmission source device, the user can cause the inhaler device 100 to store the information received from the transmission source device.

The second condition may include a predetermined user operation being performed on at least one of the inhaler device 100 or the transmission source device, together with or instead of NFC communication being disconnected and thereafter re-established between the inhaler device 100 and the transmission source device. An example of the predetermined user operation is a button of the inhaler device 100 being pressed. Another example of the predetermined user operation is a button of the transmission source device being pressed. The second condition may also include the predetermined user operation being performed on both of the inhaler device 100 and the transmission source device. With such a configuration, only in a case where the user has performed an explicit operation, it is possible to cause the inhaler device 100 to store information received from the transmission source device.

Note that, in a case where the first condition is met, the inhaler device 100 may transmit at least part of the information stored in the inhaler device 100 to the transmission source device. For example, the inhaler device 100 may receive copy target information from another inhaler device 100 and also transmit copy target information to the other inhaler device 100. With such a configuration, the inhaler device 100 can exchange copy target information with other inhaler devices 100.

(3) Procedure of Information Processing in Entire Sales System 1

Figure 7:
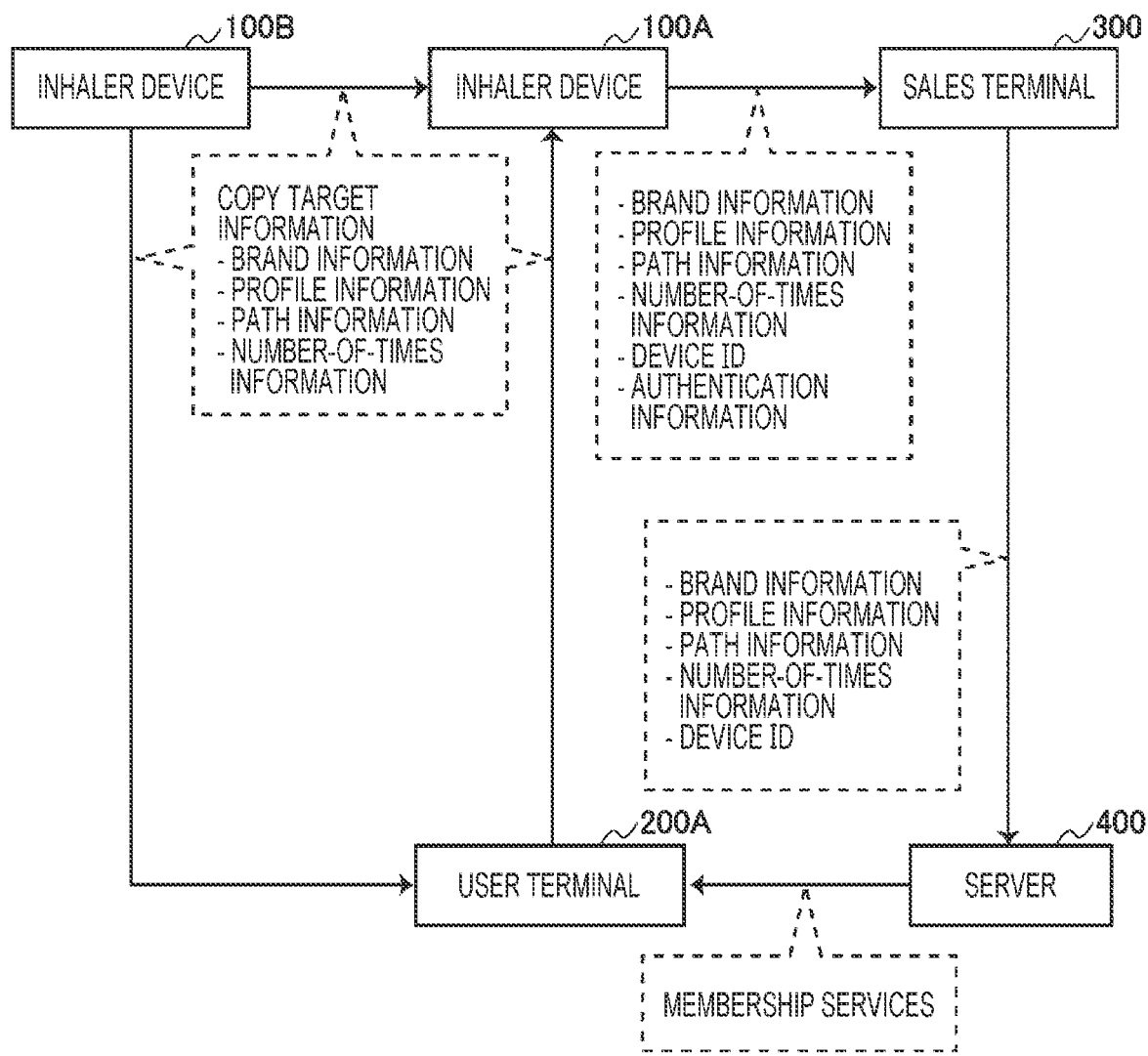
FIG. 7 is a diagram illustrating an example of the procedure of inter-device communication in the sales system according to the present embodiment.

In the following, the procedure of information processing performed in the sales system 1 will be described with reference to FIG. 7. FIG. 7 is a diagram illustrating an example of the procedure of information processing in the sales system 1 according to the present embodiment.

(3.1) Transmission and Reception of Copy Target Information

Each inhaler device 100 directly transmits and receives copy target information to and from other inhaler devices 100. Alternatively, the inhaler device 100 indirectly transmits and receives copy target information to and from other inhaler devices 100 via the user terminal 200. In the example illustrated in FIG. 7, the inhaler device 100B transmits, as copy target information, a data set including brand information, profile information, path information, and number-of-times information directly to the inhaler device 100A or indirectly to the inhaler device 100A via the user terminal 200A.

Direct Copy

Each inhaler device 100 may directly transmit and receive copy target information to and from other inhaler devices 100. In this case, for example, the inhaler device 100 transmits or receives, using the NFC communication module operating in the P2P mode, copy target information to or from another inhaler device 100.

The inhaler device 100 transmits copy target information to other inhaler devices 100 or receives copy target information from other inhaler devices 100. In the example illustrated in FIG. 7, the inhaler device 100B transmits copy target information to the inhaler device 100A, and the inhaler device 100A receives the copy target information from the inhaler device 100B. With such a configuration, copy target information can be directly copied to an inhaler device 100 from other inhaler devices 100.

The inhaler device 100 adds information regarding the inhaler device 100 to the path information included in copy target information received from another inhaler device 100. Examples of the information regarding the inhaler device 100 include the device ID of the inhaler device 100 and the user ID of the user who uses the inhaler device 100. In the example illustrated in FIG. 7, in a case where the inhaler device 100A has received the copy target information from the inhaler device 100B, the inhaler device 100A adds the device ID of the inhaler device 100A or the user ID of the user A to the path information included in the received copy target information. With such a configuration, the path information can be appropriately updated in a case where direct copy is performed.

The inhaler device 100 increments the number-of-times information included in copy target information received from another inhaler device 100. In the example illustrated in FIG. 7, in a case where the inhaler device 100A has received the copy target information from the inhaler device 100B, the inhaler device 100A increments the number-of-times information included in the received copy target information. With such a configuration, the number-of-times information can be appropriately updated in a case where direct copy is performed.

Indirect Copy

Each inhaler device 100 may indirectly transmit and receive copy target information to and from other inhaler devices 100 via the user terminal 200. For example, the inhaler device 100 has an NFC tag, and the NFC reader/writer of the user terminal 200 reads out copy target information from the NFC tag of the inhaler device 100 and writes copy target information into the NFC tag of the inhaler device 100.

The user terminal 200 receives copy target information from the inhaler device 100 or transmits copy target information to the inhaler device 100. For example, the user terminal 200 receives copy target information from another inhaler device 100. Subsequently, the user terminal 200 transmits the received copy target information to the inhaler device 100. Subsequently, the inhaler device 100 receives the copy target information from the user terminal 200. In the example illustrated in FIG. 7, the user terminal 200A reads out the copy target information from the NFC tag of the inhaler device 100B and writes the read-out copy target information into the NFC tag of the inhaler device 100A. With such a configuration, copy target information can be indirectly copied to the inhaler device 100 from another inhaler device 100 via the user terminal 200.

The user terminal 200 adds information regarding the inhaler device 100, which is the transmission destination, to the path information included in copy target information received from another inhaler device 100 and then transmits the copy target information to the inhaler device 100, which is the transmission destination. In the example illustrated in FIG. 7, the user terminal 200A adds the device ID of the inhaler device 100A or the user ID of the user A to the path information included in the copy target information read out from the NFC tag of the inhaler device 100B and then writes the resulting copy target information into the NFC tag of the inhaler device 100A. With such a configuration, the path information can be appropriately updated in a case where indirect copy is performed.

The user terminal 200 increments the number-of-times information included in copy target information received from another inhaler device 100 and then transmits the resulting copy target information. In the example illustrated in FIG. 7, the user terminal 200A increments the number-of-times information included in the copy target information read out from the NFC tag of the inhaler device 100B and then writes the resulting copy target information into the NFC tag of the inhaler device 100A. With such a configuration, the number-of-times information can be appropriately updated in a case where indirect copy is performed.

Initial Registration

Initial registration of copy target information in each inhaler device 100 will be described. Initial registration refers to information, which has not been routed through another inhaler device 100, being stored as copy target information for the first time in the inhaler device 100.

Brand information may be initially registered by the user terminal 200. In one example, the user terminal 200 may acquire brand information through the membership services or a Web site supplied from the server 400 and write the brand information into the inhaler device 100. In another example, the user terminal 200 may write, into the inhaler device 100, brand information acquired by performing image recognition on an image obtained by capturing the package of a substrate.

Brand information may be initially registered by the inhaler device 100 itself. For example, information representing the brand information of a substrate may be given to the substrate. In this case, the inhaler device 100 can identify the brand information of the substrate on the basis of the identification given to the substrate. For example, a colored line, a bar code, and the like can be provided on the surface of the substrate. The sensor 112 may include an image sensor for reading information provided on the surface of the substrate. The controller 116 may identify the brand information of the substrate by performing image recognition on an image obtained by the image sensor.

The inhaler device 100 may automatically identify the brand information of a substrate attached thereto and store the brand information. In this case, usability can be improved in a case where the substrate that was attached to the inhaler device 100 in the past, which is for example a substrate that is often used by the user, is purchased again.

Similarly, the profile information may be initially registered by the user terminal 200 or by the inhaler device 100.

When initial registration is performed, 0 is registered in the number-of-times information, and the device ID or the user ID of the inhaler device 100 in which copy target information is initially registered is registered in the path information.

Transmission or Reception of Information of High Priority

The inhaler device 100 may transmit or receive only information of high priority in a case where the inhaler device 100 transmits or receives information to or from other devices. With such a configuration, a communication load is reduced. Thus, even in a case where standards for relatively slow communication speed such as NFC are used, it is possible to improve the probability of successful transmission or reception of information.

Examples of information of high priority are brand information and profile information. In a case where brand information and profile information are transmitted or received without accompanying number-of-times information and path information, the number-of-times information and the path information may be reset on the reception side. That is, the number-of-times information may be set to 0, and the path information may have only the device ID or the user ID of the reception side.

(3.2) Communication Between Inhaler Device 100 and Sales Terminal 300

Each inhaler device 100 transmits at least part of the stored information to the sales terminal 300. In the example illustrated in FIG. 7, the inhaler device 100A transmits a data set including brand information, profile information, path information, number-of-times information, the device ID, and the authentication information to the sales terminal 300.

The sales terminal 300 receives information from the inhaler device 100. For example, in a case where the sales terminal 300 and the inhaler device 100 have become close to each other such that the distance therebetween is within the range where short-range wireless communication is possible, the inhaler device 100 and the sales terminal 300 transmit and receive information by performing short-range wireless communication. With such a configuration, the sales terminal 300 receives information from the inhaler device 100 that has approached the sales terminal 300 and entered the range where short-range wireless communication is possible, and thus it is possible to prevent radio interference even when, for example, the shop is crowded.

In one example, the inhaler device 100 may have an NFC tag. In contrast, the sales terminal 300 may have an NFC reader functioning as the communicator 330. In this manner, in a case where the inhaler device 100 has an NFC tag, and the sales terminal 300 has an NFC reader, the sales terminal 300 uses the NFC reader to read out information stored in the NFC tag of the inhaler device 100. With such a configuration, the user can transmit information only by, for example, placing the inhaler device 100 above the NFC reader of the sales terminal 300, so that usability can be improved.

Upon receiving information from the inhaler device 100, the sales terminal 300 performs processing corresponding to the received information. In particular, the sales terminal 300 performs processing corresponding to the copy target information received from the inhaler device 100. With such a configuration, the sales terminal 300 can acquire information not from the user terminal 200 but from the inhaler device 100 and perform processing corresponding to the acquired information. Thus, the user's time and effort for operating the user terminal 200 to transmit information are saved, so that usability can be improved.

In one example, the sales terminal 300 transmits at least part of the information received from the inhaler device 100 to the server 400. For example, the sales terminal 300 transmits the copy target information to the server 400. The server 400 stores and analyzes the information received from the sales terminal 300. An analysis result from the server 400 can be used in marketing or the like. The server 400 provides membership services on the basis of the analysis result. The membership services are provided to the user terminal 200, for example, as Web services through the Internet. With such a configuration, the user can receive appropriate membership services reflecting the purchase behaviors of the members only by purchasing a substrate using the inhaler device 100, that is, without taking time and effort to operate the user terminal 200 to transmit information to the server 400.

In another example, the sales terminal 300 may perform processing for selling a substrate in accordance with information received from the inhaler device 100. For example, the sales terminal 300 may perform processing for selling, as a substrate that the user wants to purchase, a substrate of the brand indicated by the brand information included in copy target information received from the inhaler device 100. With such a configuration, the user can purchase a desired substrate without verbally specifying the desired substrate to a salesperson.

More specifically, the sales terminal 300 may output substrate position information indicating the position where substrates of the brand indicated by the brand information received from the inhaler device 100 are stored. In a case where substrates are displayed by brand on display shelves installed in the store, the substrate position information includes information indicating the position where substrates of the target brand are displayed. The substrate position information may be displayed as, for example, an image on a display of the sales terminal 300. In this case, for example, the brand name and package of a substrate of the target brand may be displayed together with the substrate position information. It is desirable that not only the salesperson but also the user can confirm these items of information in order to prevent purchase of an undesired substrate. In addition, in a case where the display shelves have light-emitting devices at positions corresponding to a plurality of respective brands of substrates, the light-emitting device provided at the position corresponding to the desired substrate may emit light as output of the substrate position information. With such a configuration, the salesperson can accurately and quickly find a substrate desired by the user from the display shelves.

To perform processing described above, the sales terminal 300 may store substrate position information regarding a plurality of substrates that the store sells. For example, the sales terminal 300 may associate the brand information of each of the plurality of substrates, which the store sells, with the substrate position information of the substrate and store the associated information. The sales terminal 300 may output, from among the plurality of stored items of substrate position information, substrate position information corresponding to the substrates indicated by the brand information included in the information acquired from the inhaler device 100. With such a configuration, the sales terminal 300 can properly output the substrate position information of a desired substrate.

The sales terminal 300 may perform authentication on the basis of the authentication information received from the inhaler device 100. For example, the sales terminal 300 determines that the user is successfully verified in a case where the age of the user indicated by the authentication information is a predetermined age or older, and determines that the user is not successfully verified in a case other than the above case. With such a configuration, it is possible to prevent a substrate from being accidentally sold to a user who is not allowed to purchase substrates.

(3.3) Communication Between Sales Terminal 300 and Server 400

The sales terminal 300 transmits at least part of the information received from the inhaler device 100 to the server 400. In the example illustrated in FIG. 7, the sales terminal 300 transmits a data set including the brand information, the profile information, the path information, the number-of-times information, and the device ID to the server 400.

The server 400 performs analysis based on information received from the sales terminal 300. In particular, the server 400 performs analysis based on copy target information.

Subsequently, the server 400 provides membership services on the basis of the analysis result.

In one example, the server 400 may summarize collected items of copy target information on a brand information basis. Table 2 below is an example of collected results.

TABLE 2

Example of collected results of copy target information on brand information basis

| brand information | number-of-times information | path information | ... |
|---|---|---|---|
| brand_X | 1 | B, C | ... |
|  | 3 | A, B, C | ... |
|  | ... | ... | ... |
| brand_Y | ... | ... | ... |
| ... | ... | ... | ... |

"A", "B", and "C" included in the path information in Table 2 are the device ID of the inhaler device 100A, that of the inhaler device 100B, and that of an inhaler device 100C, respectively.

The server 400 summarizes items of number-of-times information having the same brand information and included in items of copy target information to obtain, on a brand information basis, a total value representing the number of times copy was performed. The server 400 may specify, on the basis of the total values, brand information that was copied many times among the members, that is, a brand popular among the members. Subsequently, the server 400 may provide, as a membership service, information for recommending the brand popular among the members.

In another example, the server 400 may also summarize the collected items of copy target information on a profile information basis. Table 3 below is an example of collected results.

TABLE 3

Example of collected results of copy target information on profile information basis

| profile information | number-of-times information | path information | ... |
|---|---|---|---|
| P | 1 | B, C | ... |
|  | 2 | A, B, C | ... |
|  | ... | ... | ... |
| Q | ... | ... | ... |
| ... | ... | ... | ... |

The server 400 summarizes items of number-of-times information having the same profile information and included in items of copy target information to obtain, on a profile information basis, a total value representing the number of times copy was performed. The server 400 may specify, on the basis of the total values, profile information that was copied many times among the members, that is, a profile popular among the members. Subsequently, the server 400 may provide, as a membership service, information for recommending the profile popular among the members.

Note that the items of profile information may be summarized after being classified into categories. For example, the server 400 may classify the items of profile information into a plurality of categories such as a strong type and a light type, calculate a total value representing the number of times copy was performed on a category basis, and specify a category popular among the members. Note that profiles customized by users may be classified into one category as a user customization type regardless of differences in parameter.

In addition, the server 400 may specify an enhancer on the basis of number-of-times information and path information. In this case, an enhancer is a user who repeatedly copies copy target information. The server 400 summarizes items of number-of-times information included in items of copy target information that include the same user in the path information to obtain, on a user basis, a total value representing the number of times copy was performed. Note that the server 400 may associate, in advance, the device IDs of inhaler devices 100 with the user IDs of the users and prestore the associated information. In a case where the path information includes device IDs, the server 400 may specify the users on the path from the device IDs included in the path information. The server 400 may specify, on the basis of the total values, users who copied many items of copy target information, that is, enhancers. With such a configuration, enhancers can be specified, and measures can be taken such as recommendation of substrates to the enhancers in a prioritized manner.

Moreover, the server 400 may specify relationships between the users on the basis of the number-of-times information and path information. For example, in a case where the device ID of an inhaler device 100 that has copied copy target information is added to the end of the path information every time the copy target information is copied, it is clear that the copy target information has been copied between two inhaler devices 100 whose device IDs are next to each other in the path information. The server 400 thus assumes that the users of the two inhaler devices 100 between which the copy target information was copied have a direct relationship. Moreover, the server 400 may estimate the strength of the relationship between the users on the basis of a total value representing the number of times copy was performed between the users who are assumed to have a direct relationship. With such a configuration, the relationships between the users can be specified, and measures can be taken such as recommendation of substrates on a group basis.

The server 400 may also analyze which brand of substrate has been sold by the sales terminal 300 to which user, that is, which user has purchased which substrate, on the basis of the device IDs and the brand information.

(4) Procedure of Processing

Direct Copy

Figure 8:
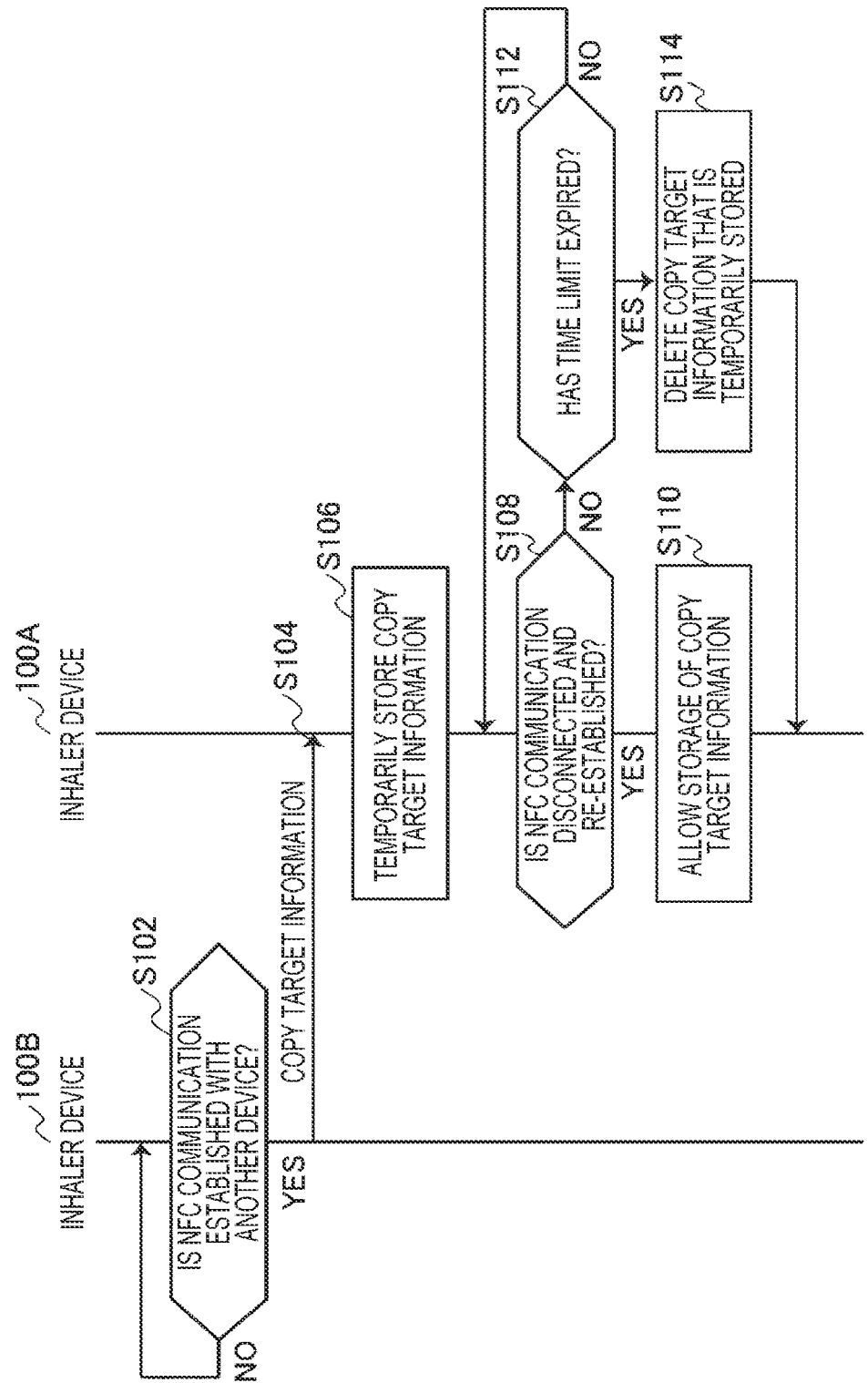
FIG. 8 is a sequence diagram illustrating an example of the procedure of processing performed by the sales system according to the present embodiment.

FIG. 8 is a sequence diagram illustrating an example of the procedure of processing performed by the sales system 1 according to the present embodiment. The inhaler device 100A and the inhaler device 100B are involved in the present sequence. The present sequence illustrates an example in which copy target information is directly copied between the inhaler devices 100.

As illustrated in FIG. 8, first, the inhaler device 100B determines whether or not NFC communication is established with another device (step S102). In this case, NFC communication is communication between NFC communication modules operating in the P2P mode.

The inhaler device 100B stays on standby until NFC communication is established with another device (step S102: NO). In a case where it is determined that NFC communication is established with another device (step S102: YES), the inhaler device 100B transmits copy target information through the established NFC communication (step S104). For example, in a case where NFC communication is established with the inhaler device 100A, the inhaler device 100B transmits the copy target information to the inhaler device 100A.

The inhaler device 100A temporarily stores the received copy target information (step S106). For example, the inhaler device 100A stores the copy target information with a time limit imposed and starts a timer for detecting a timeout when the time limit expires.

Next, the inhaler device 100A determines whether or not NFC communication between the inhaler device 100A and the inhaler device 100B is disconnected and thereafter re-established (step S108).

In a case where it is determined that NFC communication between the inhaler device 100A and the inhaler device 100B is disconnected and thereafter re-established (step S108: YES), the inhaler device 100A allows storage of the copy target information (step S110). For example, the inhaler device 100A resets the time limit added to the copy target information.

In contrast, in a case where it is determined that NFC communication between the inhaler device 100A and the inhaler device 100B is not disconnected or that NFC communication is not re-established between the inhaler device 100A and the inhaler device 100B after being disconnected (step S108: NO), the inhaler device 100A determines whether or not the time limit has expired (step S112). In a case where it is determined that the time limit has not expired (step S112: NO), the process returns to step S108 again. In contrast, in a case where it is determined that the time limit has expired (step S112: YES), the inhaler device 100A deletes the copy target information that is temporarily stored (step S114).

Note that, in the present flowchart, the example has been described in which the inhaler device 100B determines whether or not NFC communication is established and transmits the copy target information in a case where it is determined that NFC communication is established; however, the present invention is not limited to this example. The inhaler device 100A may determine whether or not NFC communication is established and read out copy target information from the inhaler device 100B in a case where it is determined that NFC communication is established. Reading by the inhaler device 100A can be achieved when, for example, the inhaler device 100A requests the inhaler device 100B to transmit copy target information, and the inhaler device 100B transmits the copy target information in response to the request.

Indirect Copy

Figure 9:
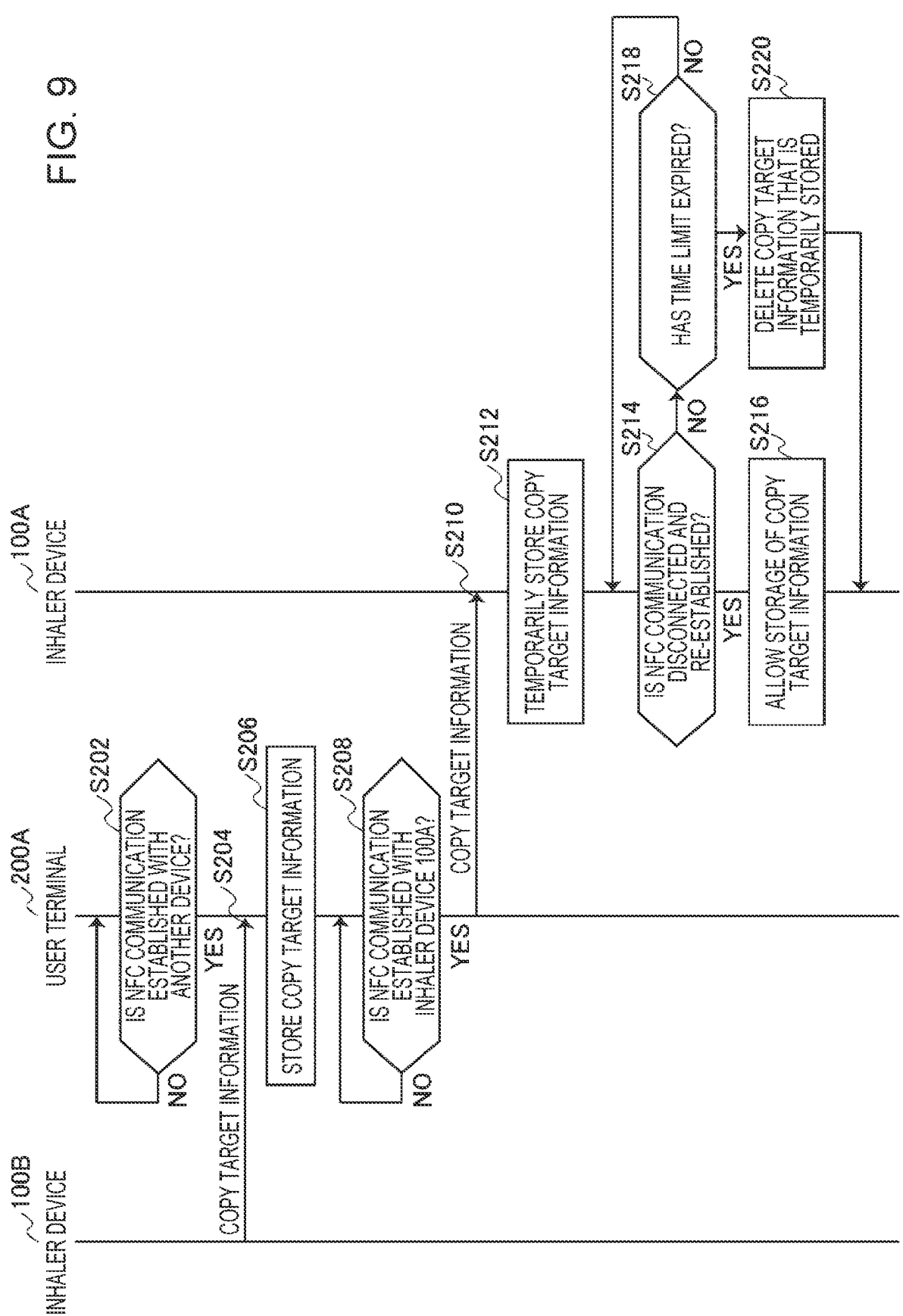
FIG. 9 is a sequence diagram illustrating an example of the procedure of processing performed by the sales system according to the present embodiment.

FIG. 9 is a sequence diagram illustrating an example of the procedure of processing performed by the sales system 1 according to the present embodiment. The inhaler device 100A, the inhaler device 100B, and the user terminal 200A are involved in the present sequence. The present sequence illustrates an example in which copy target information is indirectly copied between the inhaler devices 100 via the user terminal 200.

As illustrated in FIG. 9, first, the user terminal 200A determines whether or not NFC communication is established with another device (step S202). In this case, NFC communication is communication between the NFC reader/writer of the user terminal 200A and an NFC tag. The user terminal 200A makes such a determination by performing polling.

The user terminal 200A stays on standby until NFC communication is established with another device (step S202: NO). In a case where it is determined that NFC communication is established with another device (step S202: YES), the user terminal 200A reads out copy target information through the established NFC communication (step S204). For example, in a case where NFC communication is established with the inhaler device 100B, the user terminal 200A reads out copy target information from the inhaler device 100B. Subsequently, the user terminal 200A stores the read-out copy target information (step S206).

Next, the user terminal 200A determines whether or not NFC communication is established with the inhaler device 100A (step S208). In this case, NFC communication is communication between the NFC reader/writer of the user terminal 200A and an NFC tag. The user terminal 200A makes such a determination by performing polling.

The user terminal 200A stays on standby until NFC communication is established with the inhaler device 100A (step S208: NO). In a case where it is determined that NFC communication is established with the inhaler device 100A (step S208: YES), the user terminal 200A transmits the copy target information through the established NFC communication (step S210). For example, the user terminal 200A writes, into the NFC tag of the inhaler device 100A, the copy target information read out from the inhaler device 100B.

The inhaler device 100A temporarily stores the received copy target information (step S212). For example, the inhaler device 100A stores the copy target information with a time limit imposed and starts a timer for detecting a timeout when the time limit expires.

Next, the inhaler device 100A determines whether or not NFC communication between the inhaler device 100A and the user terminal 200A is disconnected and thereafter re-established (step S214).

In a case where it is determined that NFC communication between the inhaler device 100A and the user terminal 200A is disconnected and thereafter re-established (step S214: YES), the inhaler device 100A allows storage of the copy target information (step S216). For example, the inhaler device 100A resets the time limit added to the copy target information.

In contrast, in a case where it is determined that NFC communication between the inhaler device 100A and the user terminal 200A is not disconnected or that NFC communication is not re-established between the inhaler device 100A and the user terminal 200A after being disconnected (step S214: NO), the inhaler device 100A determines whether or not the time limit has expired (step S218). In a case where it is determined that the time limit has not expired (step S218: NO), the process returns to step S214 again. In contrast, in a case where it is determined that the time limit has expired (step S218: YES), the inhaler device 100A deletes the copy target information that is temporarily stored (step S220).

3. SUMMARY

Preferable embodiments of the present invention have been described above in detail with reference to the attached drawings; however, the present invention is not limited to these examples. It is clear that a person with ordinary knowledge in the technical field which the present invention belongs to can conceive various types of change examples or modification examples within the scope of the technical ideas described in the claims. It is understood that these also clearly belong to the technical scope of the present invention.

For example, in the embodiments described above, the example has been described in which the sales terminal 300 is implemented as a cash register or a POS terminal installed in a store that sells substrates; however, the present invention is not limited to this example. For example, the sales terminal 300 may be implemented as a vending machine. In this case, the sales terminal 300 may display, in an exaggerated manner, a button for selecting a substrate corresponding to brand information received from an inhaler device 100 and can provide the substrate in exchange for insertion of money from the user.

For example, in the embodiments described above, the examples have been mainly described in which NFC is used in wireless communication between the inhaler device 100 and the user terminal 200, wireless communication between the inhaler device 100 and the sales terminal 300, and wireless communication between the inhaler device 100 and another inhaler device 100; however, the present invention is not limited to these examples. For example, at least any one out of these wireless communications may be performed using another short-range wireless communication standard such as Bluetooth.

The inhaler device 100 may be configured such that the outer shell is changeable, and the communication module may be provided in the outer shell. For example, an NFC tag may be provided in the outer shell.

For example, at least some of the structural elements included in the sales terminal 300 may be externally attached to the sales terminal 300. For example, among the functions of the communicator 330, the function of communicating with inhaler devices 100 (for example, an NFC reader/writer) may be externally attached to the sales terminal 300. The same applies to the other structural elements of the sales terminal 300 and the structural elements of other devices.

For example, in the embodiments described above, the example has been described in which the server 400 collects information via the sales terminal 300; however, the present invention is not limited to this example. For example, the user terminal 200 may transmit information to the server 400. In one example, the user terminal 200 may transmit, to the server 400 in a separate manner, information for which synchronization has been achieved between the user terminal 200 and the inhaler device 100.

For example, the inhaler device 100 may store a plurality of items of brand information. The inhaler device 100 may select, from among the plurality of stored items of brand information, brand information to be transmitted. For example, the inhaler device 100 may transmit the brand information of the substrate that was most recently used. The same applies to profile information.

Note that the series of processes performed by each device and described in the present specification may be realized using any one out of software, hardware, and a combination of software and hardware. Programs constituting the software are prestored in, for example, the inside of each of the devices or recording media installed outside the devices (non-transitory media). Subsequently, when each program is executed by a computer, the program is loaded into, for example, a RAM of the computer and executed by a processor such as a CPU of the computer. Examples of the recording media described above include a magnetic disk, an optical disc, a magneto-optical disk, and a flash memory. Moreover, the computer programs described above may be distributed through, for example, networks without using recording media.

The processes described using the flowcharts and sequence diagrams in the present specification do not always have to be performed in the illustrated orders. Some of the processing steps may be performed in parallel. Moreover, additional processing steps may be performed, or some of the processing steps may be omitted.

Note that the configurations as in the following also belong to the technical scope of the present invention.

(1)

An inhaler device that generates, using a substrate, an aerosol to be inhaled by a user, the inhaler device including:
 a memory that stores information,
 a communicator that receives information from another device in a case where a first condition is met, and
 a controller that causes the memory to store information received from the other device in a case where a second condition is met.

(2)

The inhaler device according to (1) described above,
 in which the first condition includes wireless communication being established between the inhaler device and the other device.

(3)

The inhaler device according to (1) or (2) described above,
 in which the second condition includes wireless communication being disconnected and thereafter re-established between the inhaler device and the other device.

(4)

The inhaler device according to any one of (1) to (3) described above,
 in which the second condition includes a predetermined user operation being performed on at least any one of the inhaler device or the other device.

(5)

The inhaler device according to any one of (1) to (4) described above,
 in which wireless communication performed between the inhaler device and the other device is short-range wireless communication.

(6)

The inhaler device according to (5) described above,
 in which the short-range wireless communication is near field communication (NFC).

(7)

The inhaler device according to any one of (1) to (6) described above,
 in which the inhaler device temporarily stores, with a time limit imposed, the information received from the other device in a case where the first condition is met, resets the time limit added to the information temporarily stored and received from the other device in a case where the second condition is met before the time limit expires, and deletes the information temporarily stored and received from the other device in a case where the time limit has expired without the second condition being met.

(8)

The inhaler device according to any one of (1) to (7) described above,
 in which the inhaler device stores, in a volatile storage medium, the information received from the other device in a case where the first condition is met, and stores, in a non-volatile storage medium, the information received from the other device and stored in the volatile storage medium in a case where the second condition is met.

(9)

The inhaler device according to any one of (1) to (8) described above,
in which the information received from the other device includes identification information of the substrate.

(10)

The inhaler device according to any one of (1) to (9) described above,
in which the information received from the other device includes profile information indicating a profile in which an operation is defined that the inhaler device performs to heat the substrate in order to generate the aerosol.

(11)

The inhaler device according to (10) described above,
in which the profile information is identification information indicating the profile.

(12)

The inhaler device according to any one of (1) to (11) described above,
in which the information received from the other device includes identification information indicating a combination of identification information of the substrate and profile information indicating a profile in which an operation is defined that the inhaler device performs to heat the substrate in order to generate the aerosol.

(13)

The inhaler device according to (12) described above,
in which the information received from the other device includes path information indicating a path along which the information received from the other device has been transmitted or received.

(14)

The inhaler device according to (13) described above,
in which the path information includes identification information indicating the inhaler device, through which the information received from the other device has been routed.

(15)

The inhaler device according to (13) or (14) described above,
in which the path information includes identification information indicating the user, who uses the inhaler device, through which the information received from the other device has been routed.

(16)

The inhaler device according to any one of (1) to (15) described above,
in which the information received from the other device includes number-of-times information representing a number of times the information received from the other device has been transmitted or received.

(17)

The inhaler device according to (16) described above,
in which the number-of-times information includes a number of inhaler devices through which the information received from the other device has been routed.

(18)

The inhaler device according to (16) or (17) described above,
in which the number-of-times information includes a number of users who use inhaler devices through which the information received from the other device has been routed.

(19)

A system including:
a plurality of inhaler devices that generate, using substrates, aerosols to be inhaled by users, in which
an inhaler device among the inhaler devices receives information from another inhaler device among the inhaler devices in a case where a first condition is met, and
the inhaler device stores the information received from the other inhaler device in a case where a second condition is met.

(20)

A program for causing a computer that controls an inhaler device that generates, using a substrate, an aerosol to be inhaled by a user to execute:
receiving information from another device in a case where a first condition is met, and
storing the information received from the other device in a case where a second condition is met.

REFERENCE SIGNS LIST 1 sales system
100 inhaler device
110 power supply unit
111 power supply
112 sensor
113 notifier
114 memory
115 communicator
116 controller
120 cartridge
121 heater
122 liquid guide
123 liquid storage
124 mouthpiece
130 flavor imparting cartridge
131 flavor source
140 holder
141 internal space
142 opening
143 bottom
144 heat insulator
150 stick substrate
151 substrate
152 inhalation port
180 airflow path
181 air inlet hole
182 air outlet hole
200 user terminal
300 sales terminal
400 server

The invention claimed is:

1. An inhaler device that generates, using a substrate, an aerosol to be inhaled by a user, the inhaler device comprising:
a memory that stores information;
a communicator that receives information from another device in a case where a first condition is met; and
a controller that causes the memory to store information received from the other device in a case where a second condition is met,
wherein the inhaler device temporarily stores, with a time limit imposed, the information received from the other device in a case where the first condition is met, resets the time limit added to the information temporarily stored and received from the other device in a case where the second condition is met before the time limit expires, and deletes the information temporarily stored and received from the other device in a case where the time limit has expired without the second condition being met.

2. The inhaler device according to claim 1, wherein the first condition includes wireless communication being established between the inhaler device and the other device.

3. The inhaler device according to claim 1, wherein the second condition includes wireless communication being disconnected and thereafter re-established between the inhaler device and the other device.

4. The inhaler device according to claim 1, wherein the second condition includes a predetermined user operation being performed on at least any one of the inhaler device or the other device.

5. The inhaler device according to claim 1, wherein wireless communication performed between the inhaler device and the other device is short-range wireless communication.

6. The inhaler device according to claim 5, wherein the short-range wireless communication is near field communication (NFC).

7. The inhaler device according to claim 1, wherein the inhaler device stores, in a volatile storage medium, the information received from the other device in a case where the first condition is met, and stores, in a non-volatile storage medium, the information received from the other device and stored in the volatile storage medium in a case where the second condition is met.

8. The inhaler device according to claim 1, wherein the information received from the other device includes identification information of the substrate.

9. The inhaler device according to claim 1, wherein the information received from the other device includes profile information indicating a profile in which an operation is defined that the inhaler device performs to heat the substrate in order to generate the aerosol.

10. The inhaler device according to claim 9, wherein the profile information is identification information indicating the profile.

11. The inhaler device according to claim 1, wherein the information received from the other device includes identification information indicating a combination of identification information of the substrate and profile information indicating a profile in which an operation is defined that the inhaler device performs to heat the substrate in order to generate the aerosol.

12. The inhaler device according to claim 11, wherein the information received from the other device includes path information indicating a path along which the information received from the other device has been transmitted or received.

13. The inhaler device according to claim 12, wherein the path information includes identification information indicating the inhaler device, through which the information received from the other device has been routed.

14. The inhaler device according to claim 12, wherein the path information includes identification information indicating the user, who uses the inhaler device, through which the information received from the other device has been routed.

15. The inhaler device according to claim 1, wherein the information received from the other device includes number-of-times information representing a number of times the information received from the other device has been transmitted or received.

16. The inhaler device according to claim 15, wherein the number-of-times information includes a number of inhaler devices through which the information received from the other device has been routed.

17. The inhaler device according to claim 15, wherein the number-of-times information includes a number of users who use inhaler devices through which the information received from the other device has been routed.

18. A system comprising:
a plurality of inhaler devices that generate, using substrates, aerosols to be inhaled by users, wherein
an inhaler device among the inhaler devices receives information from another inhaler device among the inhaler devices in a case where a first condition is met, and
the inhaler device stores the information received from the other inhaler device in a case where a second condition is met,
wherein the inhaler device temporarily stores, with a time limit imposed, the information received from the other device in a case where the first condition is met, resets the time limit added to the information temporarily stored and received from the other device in a case where the second condition is met before the time limit expires, and deletes the information temporarily stored and received from the other device in a case where the time limit has expired without the second condition being met.

19. A non-transitory computer readable medium having a program stored therein, the program for causing a computer that controls an inhaler device that generates, using a substrate, an aerosol to be inhaled by a user to execute:
receiving information from another device in a case where a first condition is met,
storing the information received from the other device in a case where a second condition is met, and
temporarily storing, with a time limit imposed, the information received from the other device in a case where the first condition is met, resets the time limit added to the information temporarily stored and received from the other device in a case where the second condition is met before the time limit expires, and deletes the information temporarily stored and received from the other device in a case where the time limit has expired without the second condition being met.

* * * * *